US012736465B2

(12) United States Patent
Hagemann et al.

(10) Patent No.: US 12,736,465 B2
(45) Date of Patent: Sep. 15, 2026

(54) SPECTROSCOPIC ANALYSIS APPARATUS COMPRISING A MULTI-CHAMBER CUVETTE FOR FLUID OR GAS ANALYSIS AND CORRESPONDING METHOD

(71) Applicant: SICK AG, Waldkirch (DE)

(72) Inventors: Benjamin Hagemann, Simonswald (DE); Ralf Warratz, Hamburg (DE)

(73) Assignee: SICK AG, Waldkirch (DE)

( * ) Notice: Subject to any disclaimer, the term of this patent is extended or adjusted under 35 U.S.C. 154(b) by 106 days.

(21) Appl. No.: 18/605,177

(22) Filed: Mar. 14, 2024

(65) Prior Publication Data

US 2024/0310275 A1 Sep. 19, 2024

(30) Foreign Application Priority Data

Mar. 17, 2023 (DE) ........................ 102023106820.2

(51) Int. Cl.
*G01N 21/31* (2006.01)
*G01N 21/03* (2006.01)

(52) U.S. Cl.
CPC ............ *G01N 21/31* (2013.01); *G01N 21/03* (2013.01)

(58) Field of Classification Search
CPC ..................................................... G01H 9/004
See application file for complete search history.

(56) References Cited

U.S. PATENT DOCUMENTS 3,725,701 A * 4/1973 Link .................. G01N 21/3504 250/343
4,885,469 A * 12/1989 Yamagishi ............ G01N 21/37 250/343
4,937,448 A * 6/1990 Mantz .................. G01N 21/39 356/325

(Continued)

FOREIGN PATENT DOCUMENTS

CN 1237337 C * 1/2006 ............ A61B 5/097
DE 69828799 T2 1/2006

(Continued)

OTHER PUBLICATIONS

Search Report dated Jul. 18, 2024 issued in corresponding European Application No. 24162035.0.

*Primary Examiner* — Kara E. Geisel
(74) *Attorney, Agent, or Firm* — Nath, Goldberg & Meyer; Jerald L. Meyer

(57) ABSTRACT

A spectroscopic analysis apparatus comprises a multi-chamber cuvette for fluid or gas analysis, wherein the multi-chamber cuvette comprises at least two measurement chambers into which fluid or gas can be introduced for analysis, wherein the at least two measurement chambers are optically separated from one another, wherein an illumination device is provided to generate light and to couple the light into the at least one first and second measurement chamber, and wherein a detection device is provided to measure an intensity of the light radiated by the fluid or gas in the first measurement chamber for a first wavelength and to generate (Continued)

Figures 1, 2:
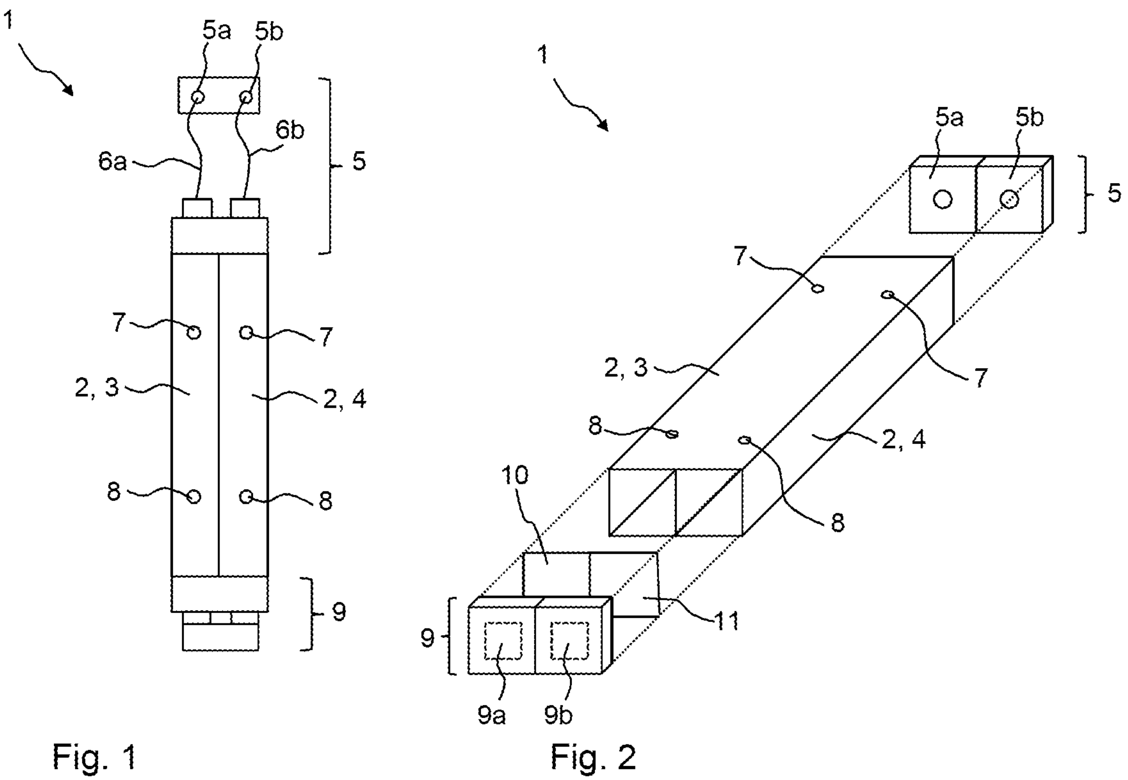

a first measurement result and to measure an intensity of the light radiated by the fluid or gas in the second measurement chamber for a second wavelength and to generate a second measurement result, wherein the first wavelength and the second wavelength are different.

19 Claims, 4 Drawing Sheets

(56) References Cited

U.S. PATENT DOCUMENTS 5,314,825 A * 5/1994 Weyrauch ............ G01N 35/025 422/63
5,521,384 A * 5/1996 Lynch .................... G01N 21/05 250/910
5,572,032 A * 11/1996 Fujiwara .............. G01N 21/276 250/343
5,747,809 A * 5/1998 Eckstrom ........... G01N 21/3504 250/343
6,199,257 B1 * 3/2001 Munk .................... G01N 30/74 29/458
6,633,036 B2 * 10/2003 Ohkubo ............. G01N 21/3504 250/343
6,940,083 B2 * 9/2005 Mori .................... G01N 33/004 250/573
7,063,667 B1 * 6/2006 Ben-Oren ............ A61B 5/0836 73/23.3
7,176,460 B1 * 2/2007 Wong ................. G01N 21/3504 250/336.1
8,217,355 B1 * 7/2012 Wong ................... G01N 21/274 250/252.1
9,030,666 B2 * 5/2015 Bitter ................. G01N 21/3504 356/432
9,591,992 B2 * 3/2017 Kubo ................... A61B 5/0836
11,009,455 B2 5/2021 Huang et al.
11,198,121 B1 * 12/2021 Guo .................. B01L 3/502715
2005/0078308 A1 * 4/2005 Gilby ................. G01N 21/0303 356/246
2009/0306527 A1 * 12/2009 Kubo ................... A61B 5/0836 600/543
2014/0170737 A1 * 6/2014 Indermuhle ........ G01N 33/5304 435/287.2
2019/0317013 A1 * 10/2019 Weidman .................. G01J 3/42

FOREIGN PATENT DOCUMENTS

DE 202019101137 U1 4/2019
DE 202021104857 U1 12/2022
EP 1012573 B1 1/2005

* cited by examiner

SPECTROSCOPIC ANALYSIS APPARATUS COMPRISING A MULTI-CHAMBER CUVETTE FOR FLUID OR GAS ANALYSIS AND CORRESPONDING METHOD

The invention relates to a spectroscopic analysis apparatus comprising a multi-chamber cuvette for fluid or gas analysis and to a corresponding method.

Cuvettes are currently used in gas analysis apparatus. To be able to detect a plurality of gas components with one cuvette, different radiation wavelengths are, for example, alternately introduced today. The radiation wavelengths can be in the UV or IR range. This e.g. takes place via appropriate light sources. The light is introduced at one side of the cuvette, wherein the arising radiation intensity is measured at the oppositely disposed side. The gas to be analyzed absorbs different wavelength ranges to different degrees depending on the components it contains and their concentration so that the radiation intensity at the receiver side is reduced accordingly. A reliable detection of the corresponding gas components (via the wavelengths) and their concentration (via the intensity) is thereby possible.

To be able to provide different wavelengths, optical filters are known that can be mechanically pivoted into the optical path. Further information can thereby be obtained. However, this increases the complexity of the measurement design, leads to higher costs, wherein more installation space is simultaneously required and the susceptibility of the overall system to errors is increased. Furthermore, the dynamics and the accuracy of the measurement system are reduced since the pivoting in of the filters together with the actual measurement step causes a further temporal reduction of all the other measurements without filters. At the receiver side, optical elements are furthermore required to focus the radiation emerging from the cuvette onto the detectors used depending on the application. This also requires installation space and causes costs.

It is therefore the object of the present invention to create a spectroscopic analysis apparatus which has a more robust design than those from the prior art and through which shorter measurement times or, alternatively, a higher measurement accuracy is possible.

The object is satisfied with respect to the spectroscopic analysis apparatus according to independent claim 1. Advantageous further developments of the spectroscopic analysis apparatus are specified in claims 2 to 17. In claim 18, a method for the spectroscopic analysis of fluid or gas using a multi-chamber cuvette is described.

The spectroscopic analysis apparatus according to the invention comprises a multi-chamber cuvette for fluid or gas analysis. The multi-chamber cuvette has at least two measurement chambers into which the fluid or gas can be introduced for analysis. The at least two measurement chambers are optically separated from one another. This means that light that is transmitted through one measurement chamber cannot couple over into the second measurement chamber, for example through an optically transparent wall. An illumination device is also provided that is configured to generate light and to couple the light into the at least one first and second measurement chamber. Moreover, a detection device is provided that is configured to measure an intensity of the light radiated (transmitted) by the fluid or gas in the first measurement chamber for a first wavelength and to generate a first measurement result. Furthermore, the detection device is configured to measure an intensity of the light radiated by the fluid or gas in the second measurement chamber for a second wavelength and to generate a second measurement result.

The first wavelength and the second wavelength are different in this respect.

It is particularly advantageous to use a multi-chamber cuvette that comprises at least two measurement chambers. The fluid or gas to be analyzed can thereby be simultaneously examined with two different wavelengths or wavelength ranges. It can thus be particularly quickly determined which substances are contained or not contained in the fluid or gas. Higher measurement dynamics and a higher accuracy are thereby achieved than with gas analysis apparatus from the prior art.

A spatial multiplexing is achieved by using at least two measurement chambers, wherein filters that can be pivoted in can simultaneously be omitted. The robustness of the analysis apparatus is increased by omitting corresponding movable elements (e.g. a chopper wheel or filter wheel). It is emphasized that the spectroscopic analysis apparatus can naturally also comprise more than two measurement chambers. The spectroscopic analysis apparatus can thus comprise three, four or more than four measurement chambers. It is particularly advantageous that the light that radiates through the first measurement chamber is free of components of the second wavelength at the latest in the detection device.

Conversely, it also applies that the light that radiates through the second measurement chamber is free of components of the first wavelength at the latest in the detection device. As will be explained later, the light can already be generated such that it does not contain the unwanted components (narrowband light) or the unwanted components are filtered out on the transmission path by an appropriate filter arrangement.

A first wavelength range can also be used or understood instead of the first wavelength and a second wavelength range can also be used or understood instead of the second wavelength. All the disclosures relating to the first and second wavelength also apply accordingly to the first and second wavelength range. The wavelength ranges can each comprise contiguous ranges and/or non-contiguous ranges of wavelengths. According to the invention, the wavelength ranges can be different. Different wavelength ranges can, for example, have no common wavelengths or differ in at least one wavelength in each case.

The light radiated through a measurement chamber (e.g. the first or second measurement chamber) can also comprise only light of the first wavelength or only of the first wavelength range or only light of the second wavelength or only of the second wavelength range.

In an advantageous further development of the analysis apparatus, the multi-chamber cuvette is an extruded part, preferably made of extruded aluminum. The multi-chamber cuvette can thereby be manufactured particularly inexpensively.

The multi-chamber cuvette comprises metal or a metal alloy or consists of metal or a metal alloy. The material which the multi-chamber cuvette comprises is opaque for the first wavelength and the second wavelength.

In an advantageous further development of the analysis apparatus, the multi-chamber cuvette is a single-piece extruded part, preferably made of extruded aluminum. In this case, the first measurement chamber and the second measurement chamber are formed from a common part. The first measurement chamber and the second measurement chamber are preferably separated from one another by a single common partition wall. In other words, the first measurement chamber and the second measurement chamber are only separated from one another by exactly one partition wall. The first measurement chamber and the second measurement chamber preferably have the same length and/or the same cross-sectional area.

In an advantageous further development of the analysis apparatus, the first measurement chamber and the second measurement chamber are separated from one another within the analysis apparatus or within the multi-chamber cuvette so that no exchange of the fluid or gas from the first measurement chamber into the second measurement chamber is possible within the analysis apparatus or within the multi-chamber cuvette.

In an advantageous further development of the analysis apparatus, the detection device is configured to generate the first measurement result and the second measurement result in parallel. The measurement results can thereby be directly compared with one another.

In an advantageous further development of the analysis apparatus, the multi-chamber cuvette comprises at least a first and a second reference measurement chamber. Furthermore, the illumination device is configured to couple light into the at least one first and second reference measurement chamber. The detection device is configured to measure an intensity of the light radiated (transmitted) through the first reference measurement chamber for the first wavelength and to generate a first reference measurement result. Furthermore, the detection device is configured to measure an intensity of the light radiated through the second reference measurement chamber for the second wavelength and to generate a second reference measurement result. Each measurement chamber preferably comprises a corresponding reference measurement chamber. Due to the reference measurement chamber, a plausibility check or a correction of the first or second measurement result is possible. It is particularly advantageous that the light that radiates through the first reference measurement chamber is free of components of the second wavelength at the latest in the detection device.

Conversely, it also applies that the light that radiates through the second reference measurement chamber is free of components of the first wavelength at the latest in the detection device. As will be explained later, the light can already be generated such that it does not contain the unwanted components (narrowband light) or the unwanted components are filtered out on the transmission path by an appropriate filter arrangement.

In an advantageous further development of the analysis apparatus, the multi-chamber cuvette is a single-piece extruded part, preferably made of extruded aluminum. In this case, the first measurement chamber, the second measurement chamber, the first reference measurement chamber and the second reference measurement chamber are formed from a common part. The first measurement chamber, the second measurement chamber, the first reference measurement chamber and the second reference measurement chamber are preferably of the same length and/or have the same cross-sectional area. Each chamber is preferably separated from at least one other chamber by a single partition wall. In other words, the partition wall is then a common partition wall.

In an advantageous further development of the analysis apparatus, the first and the second reference measurement chamber are optically separated from one another and optically separated from the first and the second measurement chamber. It is thereby ensured that coupled-in light cannot interact with light in other measurement chambers and thus falsify the measurement results.

In an advantageous further development of the analysis apparatus, the detection device is configured to compensate the first measurement result with the first reference measurement result. Furthermore, the detection device is configured to compensate the second measurement result with the second reference measurement result. "Compensate" is in particular understood as the sensitivity of the detection device being calibrated accordingly or the degradation of the light source being considered. The intensity of the light radiated through the first or second measurement chamber can thereby be measured more accurately.

In an advantageous further development of the analysis apparatus, the detection device is configured to average the first measurement result over time and to average the second measurement result over time. The respective compensated first or second measurement result is preferably averaged over time in this process.

In an advantageous further development, the first reference measurement chamber is free of the fluid or gas to be analyzed. Additionally or alternatively, the first reference measurement chamber comprises a reference fluid or a reference gas. The reference gas can, for example, be normal air or oxygen. The sensitivity of the detection device that detects the light transmitted through the first reference measurement chamber can thereby be determined. In addition, the second reference measurement chamber is free of the fluid or gas to be analyzed.

Additionally or alternatively, the second reference measurement chamber comprises a reference fluid or a reference gas. The reference gas can, for example, be normal air. The sensitivity of the detection device that detects the light transmitted through the second reference measurement chamber can thereby be determined.

In an advantageous further development of the analysis apparatus, the first measurement chamber and the first reference measurement chamber are designed identically to one another. Additionally or alternatively, the second measurement chamber and the second reference measurement chamber are designed identically to one another. Additionally or alternatively, the at least one first measurement chamber and the second measurement chamber are designed identically to one another. Additionally or alternatively, the at least one first reference measurement chamber and the second reference measurement chamber are designed identically to one another. The term "identical" is to be understood as the respective chambers having the same volume and/or the same cross-sectional area or as the volume and/or the cross-sectional area of the respective chambers differing from one another by less than 10% or less than 5%.

The path which the light travels through the respective measurement chamber or reference measurement chamber preferably also has the same length.

In an advantageous further development of the analysis apparatus, a first filter arrangement is provided and is configured to filter out wavelengths from the light generated by the illumination device so that the light that is radiated through the first measurement chamber and through the first reference measurement chamber only includes the first wavelength or the first wavelength range at the latest (with respect to the path) in the detection device. Additionally or alternatively, a second filter arrangement is provided and is configured to filter out wavelengths from the light generated by the illumination device so that the light that is radiated through the second measurement chamber and through the second reference measurement chamber only includes the second wavelength or the second wavelength range at the latest (with respect to the path) in the detection device. In this respect, the first filter arrangement is impermeable to the second wavelength and the second filter arrangement is impermeable to the first wavelength.

In an advantageous further development of the analysis apparatus, the first filter arrangement comprises an optical filter or a gas-filled filter. Additionally or alternatively, the second filter arrangement comprises an optical filter or a gas-filled filter. The type of filter used can, for example, depend on the wavelength which the filter is intended to transmit or filter out.

In an advantageous further development of the analysis apparatus, the first filter arrangement is arranged in a fixed position in the spectroscopic analysis apparatus, wherein the first filter arrangement is permeable to light of the first wavelength and impermeable to light of the second wavelength. The first filter arrangement is arranged:

a) between the illumination device and the first measurement chamber; or
b) within the first measurement chamber; or
c) between the first measurement chamber and the detection device; or
d) within the detection device.

Furthermore, the first filter arrangement is arranged:

a) between the illumination device and the first reference measurement chamber; or
b) within the first reference measurement chamber; or
c) between the first reference measurement chamber and the detection device; or
d) within the detection device.

The wording "in a fixed position" means that the first filter arrangement cannot be replaced in an automated manner or moved by a motor. The first filter arrangement is preferably clamped between other elements so that other elements must first be dismantled for a possible replacement of the first filter arrangement. A compact and thus cost-effective design is thereby implemented. The first filter arrangement can comprise a single-piece filter element or a plurality of separate filter elements. Alternatively, an adhesive bonding can also be provided, in particular to achieve a gas-tight connection.

In an advantageous further development of the analysis apparatus, a second filter arrangement is arranged in a fixed position in the spectroscopic analysis apparatus, wherein the second filter arrangement is permeable to light of the second wavelength and impermeable to light of the first wavelength. The second filter arrangement is arranged:

a) between the illumination device and the second measurement chamber; or
b) within the second measurement chamber; or
c) between the second measurement chamber and the detection device; or
d) within the detection device.

Furthermore, the second filter arrangement is arranged:

a) between the illumination device and the second reference measurement chamber; or
b) within the second reference measurement chamber; or
c) between the second reference measurement chamber and the detection device; or
d) within the detection device.

The wording "in a fixed position" means that the second filter arrangement cannot be replaced in an automated manner or moved by a motor. The second filter arrangement is preferably clamped between other elements so that other elements must first be dismantled for a possible replacement of the second filter arrangement. A compact and thus cost-effective design is thereby implemented.

The second filter arrangement can comprise a single-piece filter element or a plurality of separate filter elements. Alternatively, an adhesive bonding can also be provided, in particular to achieve a gas-tight connection.

In an advantageous further development of the analysis apparatus, the illumination device is configured to generate a broadband light that at least includes light of the first and the second wavelength. In this case, a corresponding first or second filter arrangement is required.

In an advantageous further development of the analysis apparatus, the illumination device is configured to generate a light that at least includes light of the first and the second wavelength and wherein the at least one illumination device is configured to couple the generated light into the at least one first and second measurement chamber and into the at least one first and second reference measurement chamber, wherein the coupling in takes place via optical waveguides, for example.

In an advantageous further development of the analysis apparatus, the illumination device comprises exactly one light source or a plurality of light sources.

In an advantageous further development of the analysis apparatus, the illumination device comprises at least a first and a second light source, wherein the first light source is configured to generate light with only the first wavelength and wherein the at least one first light source is further configured to couple the generated light into the first measurement chamber and into the first reference measurement chamber. The wording "with only the first wavelength" is to be understood as a narrowband light being generated that preferably indeed includes the first wavelength, but not the second wavelength. The second light source is configured to generate light with only the second wavelength and wherein the at least one second light source is further configured to couple the generated light into the second measurement chamber and into the second reference measurement chamber. The wording "with only the second wavelength" is to be understood as a narrowband light being generated that preferably indeed includes the second wavelength, but not the first wavelength. In a further embodiment, it would also be conceivable that e.g. the narrowband light of the second wavelength lies completely or partly within the wavelength range of the narrowband light of the first wavelength. In a further embodiment, it would also be conceivable that e.g. the narrowband light of the first wavelength lies completely or partly within the wavelength range of the narrowband light of the second wavelength.

In an advantageous further development of the analysis apparatus, the illumination device is configured to couple light with the first wavelength centrally into the first measurement chamber and into the first reference measurement chamber in each case and to couple light with the second wavelength centrally into the second measurement chamber and into the second reference measurement chamber in each case. The central coupling in is implemented via a respective optical waveguide that is in each case arranged at the center of a first end face of the respective measurement chamber or reference measurement chamber.

In an advantageous further development of the analysis apparatus, the illumination device is configured to couple the light into the first measurement chamber at the first end face, wherein the light transmitted through the first measurement chamber is coupled out of the first measurement chamber at an oppositely disposed end face and fed to the first detection device. Furthermore, the illumination device is configured to couple the light into the first reference measurement chamber at a first end face, wherein the light transmitted through the first reference measurement chamber is coupled out of the first reference measurement chamber at an oppositely disposed end face and fed to the first detection device. The first detection device is in this respect configured to evaluate the light that is transmitted through the first measurement chamber and the light that is transmitted through the first reference measurement chamber separately from one another. Additionally or alternatively, the above also applies to the second measurement chamber and the second reference measurement chamber.

In an advantageous further development of the analysis apparatus, the illumination device comprises at least a first light source, in particular exactly one first light source, that is configured to generate a first light with the first wavelength. The first light source is arranged directly at the first measurement chamber and the first reference measurement chamber such that the generated first light radiates into both the first measurement chamber and the first reference measurement chamber. Alternatively, the first light source is arranged spaced apart from the first measurement chamber and the first reference measurement chamber so that the generated first light can be fed via a respective first optical waveguide to the first measurement chamber and the first reference measurement chamber. In addition, the illumination device comprises at least a second light source, in particular exactly one second light source, that is configured to generate a second light with the second wavelength. The second light source is arranged directly at the second measurement chamber and the second reference measurement chamber such that the generated second light radiates into both the second measurement chamber and the second reference measurement chamber. Alternatively, the second light source is arranged spaced apart from the second measurement chamber and the second reference measurement chamber so that the generated second light can be fed via a respective second optical waveguide to the second measurement chamber and the second reference measurement chamber.

In an advantageous further development of the analysis apparatus, the detection device comprises, for the first measurement chamber and the first reference measurement chamber for detecting light with the first wavelength, in each case a photodiode or one pyroelectric detector (each) or one image sensor (each) or one optopneumatic detector (each). The type of detection element in particular depends on the wavelength of the light to be detected. Additionally or alternatively, the detection device comprises, for the second measurement chamber and the second reference measurement chamber for detecting light with the second wavelength, in each case a photodiode or one pyroelectric detector (each) or one image sensor (each) or one optopneumatic detector (each). The type of detection element in particular depends on the wavelength of the light to be detected. Alternatively thereto, the detection device comprises, for detecting light with the first wavelength, a common first image sensor that is configured to simultaneously receive both the light radiated through the first measurement chamber and the light radiated through the first reference measurement chamber.

Additionally or alternatively thereto, the detection device comprises, for detecting light with the second wavelength, a common first image sensor that is configured to simultaneously receive both the light radiated through the first measurement chamber and the light radiated through the first reference measurement chamber. Alternatively thereto, the detection device comprises, for detecting light with the first and the second wavelength, a common image sensor. The common image sensor is configured to simultaneously receive both the light radiated through the first and second measurement chamber and the light radiated through the first and second reference measurement chamber. The evaluation preferably likewise takes place in parallel in this respect.

In an advantageous further development of the analysis apparatus, the image sensor is an area sensor or a line sensor.

In an advantageous further development of the analysis apparatus, the first image sensor is used to simultaneously receive the light of the first and second measurement chamber and of the first and second reference measurement chamber. In this further development, the differently irradiated areas of the image sensor can be read out independently of one another in parallel or in series.

In an advantageous further development of the analysis apparatus, the image sensor comprises a substrate that in particular has silicon. A semiconductor layer, which is configured to form a plurality of pixels, is arranged on the substrate.

Microlenses are preferably attached to the respective pixels. A cover glass, preferably a single-part cover glass, is arranged on the microlenses. A Lumogen coating is preferably applied to at least a part area of the cover glass.

In an advantageous further development of the analysis apparatus, the analysis apparatus is configured to feed the same fluid or the same gas to the first measurement chamber and the second measurement chamber. The analysis of the fluid or the gas can thereby be performed much faster due to the parallel measurement with different wavelengths. Alternatively thereto, the analysis apparatus is configured to feed a different fluid or a different gas to the first measurement chamber and the second measurement chamber. Two different fluids or gases can thereby be analyzed in parallel.

In an advantageous further development of the analysis apparatus, the analysis apparatus is free of a chopper wheel and/or a filter wheel. The robustness of the analysis apparatus is thereby increased.

In a further development, additional moving elements can be provided (chopper wheel and/or filter wheel) to realize further wavelength settings.

In an advantageous further development of the analysis apparatus, the at least one first reference measurement chamber and/or the second reference measurement chamber is free of a connector for feeding a fluid or gas. It is thereby ensured that the properties of the reference measurement chamber do not change.

In a further advantageous embodiment of the analysis apparatus, the at least one first reference measurement chamber and/or the second reference measurement chamber comprises an apparatus that is configured to remove possibly occurring interfering components from the optical path.

In an advantageous further development of the analysis apparatus, the at least one first measurement chamber and the second measurement chamber comprise an inlet connector to feed the fluid or gas to be analyzed to the respective at least one first and second measurement chamber. Furthermore, the at least one first measurement chamber and the second measurement chamber comprise an outlet connector to discharge the fluid or gas to be analyzed from the respective at least one first and second measurement chamber. At least the inlet connectors are preferably connected to one another so that the same fluid or gas can be fed to the at least one first and second measurement chamber. Optionally, the outlet connectors can also be connected to one another.

In an advantageous further development of the analysis apparatus, the inlet connector and the outlet connector of the respective measurement chamber are arranged offset from one another in the longitudinal direction of the measurement chamber, wherein the light also passes through the respective measurement chamber in the longitudinal direction. The fluid or gas to be analyzed is thereby introduced into the radiation path of the light for a long time, whereby the first or second measurement result is particularly accurate.

The method according to the invention for the spectroscopic analysis of fluid or gas uses a multi-chamber cuvette, wherein the multi-chamber cuvette comprises at least two measurement chambers into which the fluid or gas can be introduced for analysis. The at least two measurement chambers are optically separated from one another, wherein an illumination device and a detection device are furthermore provided. In a first method step, light is generated by the illumination device and coupled into the first and second measurement chamber. In a second method step, an intensity of the light radiated by the fluid or gas in the first measurement chamber is measured for a first wavelength and a first measurement result is generated. In a third method step, an intensity of the light radiated by the fluid or gas in the second measurement chamber is measured for a second wavelength and a second measurement result is generated, wherein the first wavelength and the second wavelength are different. The second and the third method step are preferably performed simultaneously and repeated continuously.

Figures 3, 4:
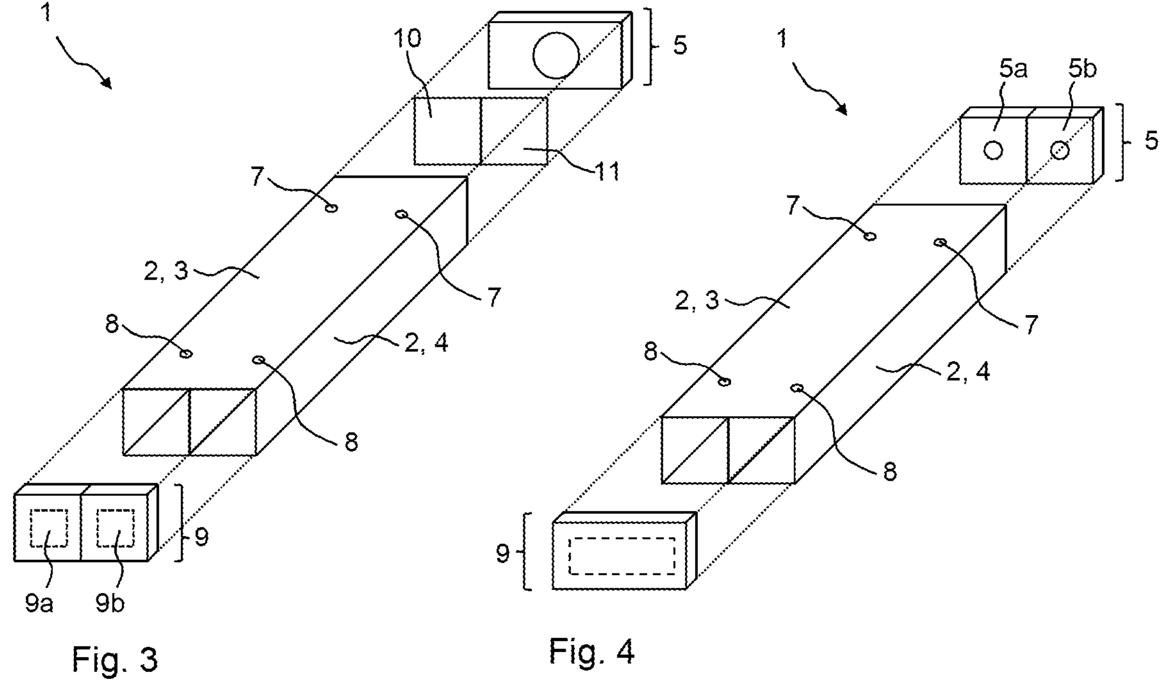
Figure 5:
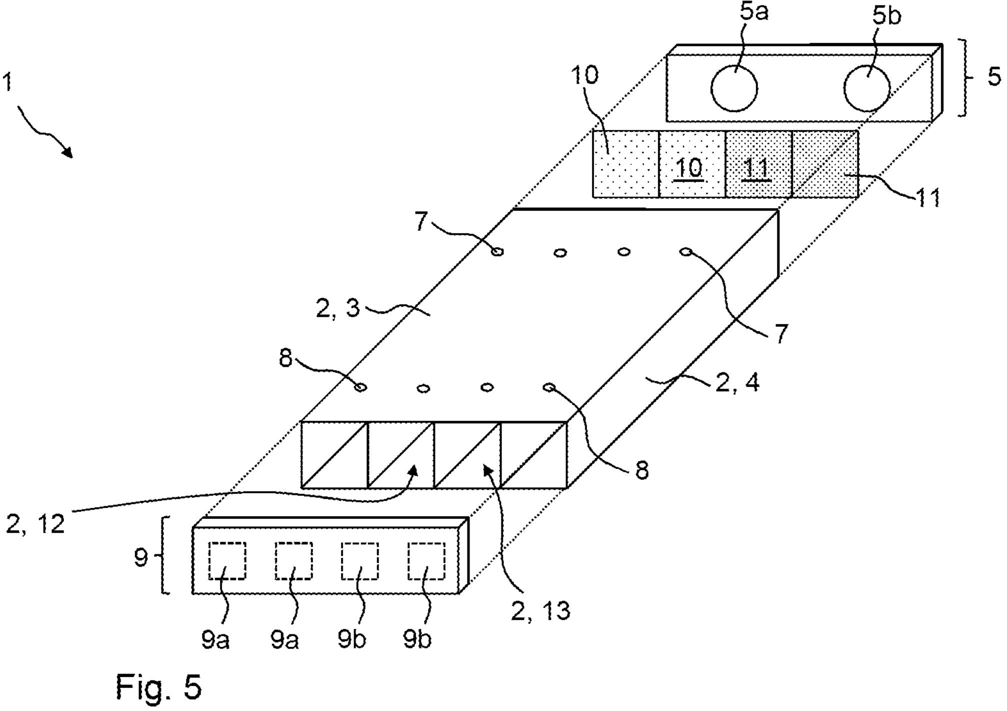
Figures 6A, 6B, 6C, 6D, 7:
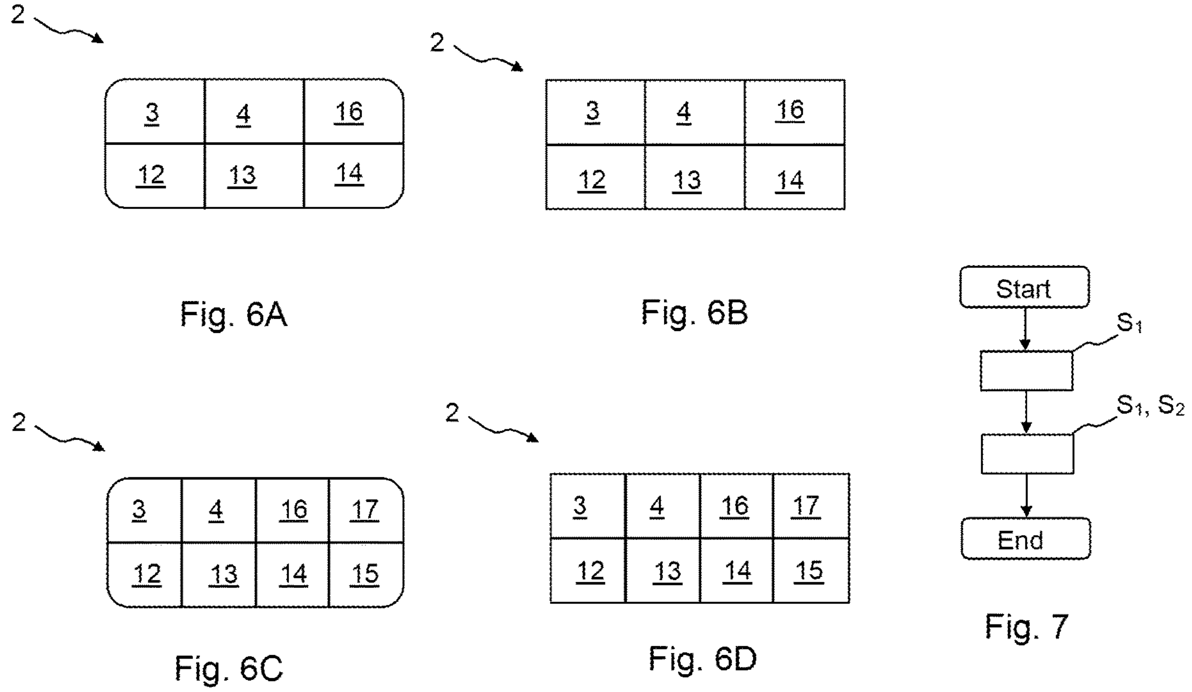

The invention will be described purely by way of example with reference to the drawings in the following. There are shown:

FIG. 1: an embodiment of the spectroscopic analysis apparatus comprising a multi-chamber cuvette;

FIGS. 2, 3, 4: various embodiments of the spectroscopic analysis apparatus in an exploded representation;

FIG. 5: an embodiment of the spectroscopic analysis apparatus comprising a multi-chamber cuvette that comprises a first and second measurement chamber and a first and second reference measurement chamber;

FIGS. 6A, 6B, 6C, 6D: different cross-sectional shapes of the multi-chamber cuvette of the spectroscopic analysis apparatus; and FIG. 7: a flowchart that describes a method for spectroscopic analysis.

FIG. 1 shows an embodiment of the spectroscopic analysis apparatus 1. The spectroscopic analysis apparatus 1 comprises a multi-chamber cuvette 2 for fluid or gas analysis. If the spectroscopic analysis apparatus 1 only serves for gas analysis, it can also be referred to as a spectroscopic gas analysis apparatus 1.

The multi-chamber cuvette 2 comprises a first a measurement chamber 3 and a second measurement chamber 4. The first measurement chamber 3 and the second measurement chamber 4 are optically separated from one another.

Furthermore, an illumination device 5 is shown. The illumination device 5 is configured to generate light and to couple it into the at least one first and second measurement chamber 3, 4. In FIG. 1, the illumination device 5 comprises two light sources 5*a*, 5*b*. The first light source 5*a* is configured to generate light of a first wavelength. The second light source 5*b* is configured to generate light with a second wavelength. Both wavelengths are different in this respect. The first light source 5*a* is connected to the first measurement chamber 3 via a first optical waveguide 6*a* so that light generated by the first light source 5*a* is coupled into the first measurement chamber 3. The second light source 5*b* is connected to the second measurement chamber 4 via a second optical waveguide 6*b* so that light generated by the second light source 5*b* is coupled into the second measurement chamber 4. The coupling in of the light preferably takes place at a respective end face of the first or second measurement chamber 3, 4.

The first wavelength can be IR light or UV light, for example. The second wavelength can be UV light or IR light, for example. It is also conceivable that both the first wavelength and the second wavelength contain light in the IR or UV range.

In this case, the light radiates within the first or second measurement chamber 2, 3 from one end face to the oppositely disposed second end face. The first measurement chamber 3 is configured so that a fluid or gas to be analyzed can be introduced into the first measurement chamber 3 into the optical path of the coupled-in light. The entire first measurement chamber 3 can preferably be filled with the fluid or gas to be analyzed. It is also possible that only a part of the first measurement chamber 3 is filled with the fluid or gas to be analyzed. The second measurement chamber 4 is likewise configured so that a fluid or gas to be analyzed can be introduced into the second measurement chamber 4 into the optical path of the coupled-in light. The entire second measurement chamber 4 can preferably be filled with the fluid or gas to be analyzed. It is also possible that only a part of the second measurement chamber 4 is filled with the fluid or gas to be analyzed. The first measurement chamber 3 and the second measurement chamber 4 are preferably filled with the same fluid or the same gas so that a corresponding analysis can be performed particularly quickly by using different wavelengths in parallel.

The fluid or gas to be analyzed can be fed into the at least one first measurement chamber 3 or second measurement chamber 4 via an inlet connector 7. The first measurement chamber 3 and the second measurement chamber 4 preferably comprise an outlet connector 8 to discharge the analyzed fluid or gas again. In the longitudinal direction of the respective first or second measurement chamber 3, 4, the inlet connector 7 and the outlet connector 8 are arranged offset from one another, wherein the inlet connector 7 is preferably arranged closer to the illumination device 5 than the outlet connector 8.

The spectroscopic analysis apparatus 1 furthermore comprises a detection device 9 that is configured to measure an intensity of the light radiated by the fluid or gas and to output a corresponding measurement result. The detection device 9 is therefore configured to measure the intensity of the light for a first wavelength that radiates through the first measurement chamber 3 in order to generate a first measurement result therefrom. The detection device 9 is further configured to measure the intensity of the light for a second wavelength that radiates through the second measurement chamber 4 in order to generate a second measurement result therefrom.

In FIG. 1, that light which is generated by the first light source 5*a* preferably only comprises the first wavelength and is in particular free of the second wavelength.

The first measurement chamber 3 is thereby only passed through by light of the first wavelength so that the first measurement result only includes the intensity of the light of the first wavelength. Furthermore, that light which is generated by the second light source 5*b* preferably only comprises the second wavelength and is in particular free of the first wavelength. The second measurement chamber 4 is thereby only passed through by light of the second wavelength so that the second measurement result only includes the intensity of the light of the second wavelength. The use of further filter arrangements is not necessary in this case.

The detection device 9 is preferably adjoins a second end face of the first or second measurement chamber 3, 4 in a flush manner. The detection device 9 preferably closes the second end face of the first or second measurement chamber 3, 4 in a fluid-tight or gas-tight manner. A corresponding rubber seal arrangement can also be provided. At the other side, the illumination device 5 preferably closes the first end face of the first or second measurement chamber 3, 4 in a fluid-tight or gas-tight manner. A corresponding rubber seal arrangement can also be provided. Alternatively, the cuvette can also be closed in a gas-tight/fluid-tight manner by another component.

The detection device 9 can be connected to a higher-ranking guiding or control device. The detection device 9 can be configured to transmit the first measurement result and the second measurement result to the higher-ranking guiding and control device. The detection device 9 is preferably configured to generate the first measurement result and the second measurement result in parallel. The first measurement result and the second measurement result are in particular averaged over time.

FIG. 2 shows an embodiment of the spectroscopic analysis apparatus 1 in an exploded representation. In contrast to FIG. 1, the illumination device 5 ends flush with the first end face of the multi-chamber cuvette 2. The illumination device 5 is free of optical waveguides. Both the first light source 5*a* and the second light source 5*b* generate a broadband light that also includes light of an undesired wavelength in addition to the desired wavelength. It is therefore possible that the first light source 5*a* generates light with the first wavelength and couples it into the first measurement chamber 3, but also generates light with an undesired wavelength, in particular with the second wavelength. The second light source 5*b* can likewise generate light with the second wavelength and couple it into the second measurement chamber 4. However, the second light source 5*b* can also generate light with an undesired wavelength, in particular with the first wavelength. The illumination device 5 preferably comprises at least one laser diode. In particular, the first light source 5*a* and/or the second light source 5*b* preferably comprises/comprise a laser diode. The first light source 5*a* and/or the second light source 5*b* can also comprise at least one LED or at least one IR light source.

To obtain meaningful and accurate first and second measurement results, a first and second filter arrangement 10, 11 are also provided. In FIG. 2, the first filter arrangement 10 is arranged between the first measurement chamber 3 and the detection device 9. The first filter arrangement 10 is configured to filter out at least the second wavelength from the light which the first light source 5*a* couples into the first measurement chamber 3. The second filter arrangement 11 is arranged between the second measurement chamber 4 and the detection device 9. The second filter arrangement 11 is configured to filter out at least the first wavelength from the light which the second light source 5*b* couples into the second measurement chamber 4.

The detection device 9 furthermore comprises a first detector element 9*a* that is configured to measure an intensity of light with the first wavelength. The first detector element 9*a* can, for example, be a photodiode, a pyroelectric detector or an image sensor. The detection device 9 furthermore comprises a second detector element 9*b* that is configured to measure an intensity of light with the second wavelength. The second detector element 9*b* can, for example, be a photodiode, a pyroelectric detector or an image sensor.

The embodiment from FIG. 2 likewise shows that the multi-chamber cuvette 2, and thus the first measurement chamber 3 and the second measurement chamber 4, is an extruded part. The first measurement chamber 3 and the second measurement chamber 4 preferably have the same length.

In FIG. 3, the illumination device 5 comprises a common light source that is configured to generate a broadband light with at least the first wavelength and the second wavelength. In the embodiment from FIG. 3, the first filter arrangement 10 is arranged between the illumination device 5 and the first measurement chamber 3. Furthermore, the second filter arrangement 11 is arranged between the illumination device 5 and the second measurement chamber 4. Unlike the embodiment from FIG. 2, in the embodiment from FIG. 3, the already filtered light is coupled into the individual measurement chambers 3, 4.

In the embodiment from FIG. 4, the first light source 5*a* is configured to generate light preferably only with the first wavelength and not with the second wavelength and to couple the light centrally into the first measurement chamber 3. The second light source 5*b* is configured to generate light preferably only with the second wavelength and not with the first wavelength and to couple the light centrally into the second measurement chamber 4. In this embodiment, no first or second filter arrangement 10, 11 is therefore necessary. Furthermore, the detection device 9 comprises an image sensor that is configured to convert both light from the first measurement chamber 3 with the first wavelength and light from the second measurement chamber 4 with the second wavelength into a corresponding first measurement result and second measurement result. In this embodiment, the image sensor is designed as an area sensor and covers both the second end face of the first measurement chamber 3 and the second end face of the second measurement chamber 4.

FIG. 5 shows a further embodiment of the spectroscopic analysis apparatus 1 comprising the multi-chamber cuvette 2. The analysis apparatus 1 comprises the first measurement chamber 3 and the second measurement chamber 4.

Furthermore, the multi-chamber cuvette comprises a first reference measurement chamber 12 and a second reference measurement chamber 13. The illumination device 5 is configured to couple light into the at least one first and second reference measurement chamber 12, 13. The detection device 9 is configured to measure an intensity of the light radiated through the first reference measurement chamber 12 for the first wavelength and to generate a first reference measurement result. The detection device 9 is further configured to measure an intensity of the light radiated through the second reference measurement chamber 13 for the second wavelength and to generate a second reference measurement result.

The first and second reference measurement chamber 12, 13 are optically separated from one another, on the one hand, and also optically separated from the first and second measurement chamber 3, 4, on the other hand.

The detection device 9 is configured to compensate the first measurement result with the first reference measurement result. The detection device 9 is further configured to compensate the second measurement result with the second reference measurement result.

The first reference measurement chamber 12 is arranged next to the first measurement chamber 3. The second reference measurement chamber 13 is arranged next to the second measurement chamber 4.

The first reference measurement chamber 12 is preferably designed identically to the first measurement chamber 3.

Additionally or alternatively, the second reference measurement chamber 13 is designed identically to the second measurement chamber 4. In this embodiment, all the measurement chambers 3, 4, 12, 13 are designed identically to one another, in particular with the same length. They preferably also comprise a similar cross-section and a similar volume. The wording "similar" can be understood as deviations of preferably less than 20% or less than 10%.

In this embodiment, the illumination device 5 comprises a first light source 5*a* and a second light source 5*b*. Both the first light source 5*a* and the second light source 5*b* are configured to generate a broadband light that comprises both the first wavelength and the second wavelength. The first light source 5*a* is arranged at the multi-chamber cuvette 2 such that it couples the generated light into both the first measurement chamber 3 and the first reference measurement chamber 12. The second light source 5*b* is arranged at the multi-chamber cuvette 2 such that it couples the generated light into both the second measurement chamber 4 and the second reference measurement chamber 13. In this embodiment, a first filter arrangement 10 is arranged between the illumination device 5 and the multi-chamber cuvette 2 and is configured to remove the second wavelength from the broadband light generated by the first light source 5*a*. In this case, the first filter arrangement 10 comprises two filter elements, wherein one filter element closes the first measurement chamber 3 and the other filter element closes the first reference measurement chamber 12 at the respective first end face. In this embodiment, a second filter arrangement 11 is arranged between the illumination device 5 and the multi-chamber cuvette 2 and is configured to remove the first wavelength from the broadband light generated by the second light source 5*b*. In this case, the second filter arrangement 11 comprises two filter elements, wherein one filter element closes the second measurement chamber 4 and the other filter element closes the second reference measurement chamber 13 at the respective first end face.

Furthermore, the detection device 9 comprises two first detector elements 9*a*, wherein a respective first detector element 9*a* is arranged at a respective one of the second end faces of the first measurement chamber 3 and the first reference measurement chamber 12. Furthermore, the detection device 9 comprises two second detector elements 9*b*, wherein a respective second detector element 9*b* is arranged at a respective one of the second end faces of the second measurement chamber 4 and the second reference measurement chamber 13.

FIGS. 6A, 6B, 6C and 6D show different cross-sectional shapes of the multi-chamber cuvette 2 of the spectroscopic analysis apparatus 1. In FIG. 6A, the multi-chamber cuvette 2 comprises a first, second and third reference measurement chamber 12, 13, 14. Furthermore, the multi-chamber cuvette 2 comprises a first, second and third measurement chamber 3, 4, 16. In cross-section, all or some of the measurement chambers 12, 13, 14, 3, 4, 16 can have rounded corner regions.

FIG. 6B shows a similar embodiment for the multi-chamber cuvette 2 to FIG. 6A, wherein, in cross-section, all the corner regions of the individual measurement chambers 12, 13, 14, 3, 4, 16 are not rounded, but angular.

FIG. 6C shows the same embodiment as FIG. 6A, except that the multi-chamber cuvette 2 comprises a first, second, third and fourth reference measurement chamber 12, 13, 14, 15 and a first, second, third and fourth measurement chamber 3, 4, 16, 17. In cross-section, all or some of the measurement chambers 12, 13, 14, 15, 3, 4, 16, 17 can have rounded corner regions.

FIG. 6D shows a similar embodiment for the multi-chamber cuvette 2 to FIG. 6B, wherein, in cross-section, all the corner regions of the individual measurement chambers 12, 13, 14, 15, 3, 4, 16, 17 are not rounded, but angular.

In FIGS. 6A, 6B, 6C, 6D, the multi-chamber cuvette 2 is a single-piece extruded part.

FIG. 7 describes a method for the spectroscopic analysis of fluid or gas using a multi-chamber cuvette 2, wherein the multi-chamber cuvette 2 comprises at least two measurement chambers 3, 4 into which the fluid or gas can be introduced for analysis. The at least two measurement chambers 3, 4 are optically separated from one another, wherein an illumination device 4 and a detection device 9 are furthermore provided. In a first method step S1, light is generated by the illumination device 5 and coupled into the first and second measurement chamber 3, 4. In a second method step S2, an intensity of the light radiated by the fluid or gas in the first measurement chamber 3 is measured for a first wavelength and a first measurement result is generated. In a third method step S3, an intensity of the light radiated by the fluid or gas in the second measurement chamber 4 is measured for a second wavelength and a second measurement result is generated, wherein the first wavelength and the second wavelength are different.

The invention is not restricted to the embodiments described. Within the scope of the invention, all the described and/or drawn features can be combined with one another as desired, unless stated otherwise.

REFERENCE NUMERAL LIST spectroscopic analysis apparatus 1
multi-chamber cuvette 2
first measurement chamber 3
second measurement chamber 4
illumination device 5
first light source 5*a*
second light source 5*b*
first optical waveguide 6*a*
second optical waveguide 6*b*
inlet connector 7
outlet connector 8
detection device 9
first detector element 9*a*
second detector element 9*b*
first filter arrangement 10
second filter arrangement 11
first reference measurement chamber 12
second reference measurement chamber 13
third reference measurement chamber 14
fourth reference measurement chamber 15
third measurement chamber 16
fourth measurement chamber 17
method steps $S_1$, $S_2$, $S_3$

The invention claimed is:

1. A spectroscopic analysis apparatus comprising:

a multi-chamber cuvette for fluid or gas analysis, wherein the multi-chamber cuvette comprises at least two measurement chambers into which fluid or gas can be introduced for analysis, wherein the at least two measurement chambers comprise at least a first measurement chamber and a second measurement chamber, and wherein the multi-chamber cuvette is a single-piece extruded part, wherein the at least two measurement chambers are optically separated from one another, wherein an illumination device is provided that is configured to generate light and to couple the light into the at least one first and second measurement chamber, wherein a detection device is provided that is configured to measure an intensity of the light radiated by the fluid or gas in the first measurement chamber for a first wavelength and to generate a first measurement result and that is further configured to measure an intensity of the light radiated by the fluid or gas in the second measurement chamber for a second wavelength and to generate a second measurement result, wherein the first wavelength and the second wavelength are different, and wherein the first measurement chamber and the second measurement chamber are separated from one another by a single common partition wall, and wherein a first length of the first measurement chamber is equal to a second length of the second measurement chamber.

2. The spectroscopic analysis apparatus according to claim 1, wherein the detection device is configured to generate the first measurement result and the second measurement result in parallel.

3. The spectroscopic analysis apparatus according to claim 1, wherein the multi-chamber cuvette comprises at least a first reference measurement chamber and a second reference measurement chamber, wherein the illumination device is configured to couple light into the first and second reference measurement chambers, and wherein the detection device is configured to:

a) measure an intensity of the light radiated through the first reference measurement chamber for the first wavelength and to generate a first reference measurement result; and b) measure an intensity of the light radiated through the second reference measurement chamber for the second wavelength and to generate a second reference measurement result.

4. The spectroscopic analysis apparatus according to claim 3, wherein the first and the second reference measurement chambers are optically separated from one another and optically separated from the first and the second measurement chambers.

5. The spectroscopic analysis apparatus according to claim 3, wherein the detection device is configured to compensate the first measurement result with the first reference measurement result, and wherein the detection device is configured to compensate the second measurement result with the second reference measurement result.

6. The spectroscopic analysis apparatus according to claim 3, wherein the detection device is configured to average the first measurement result over time and to average the second measurement result over time.

7. The spectroscopic analysis apparatus according to claim 3, wherein the first reference measurement chamber:

a) is free of the fluid or gas to be analyzed; or b) comprises a reference fluid or a reference gas; and wherein the second reference measurement chamber:

a) is free of the fluid or gas to be analyzed; or b) comprises a reference fluid or a reference gas.

8. The spectroscopic analysis apparatus according to claim 3, wherein the first measurement chamber and the first reference measurement chamber are designed identically to one another and/or wherein the second measurement chamber and the second reference measurement chamber are designed identically to one another and/or wherein the at least one first measurement chamber and the second measurement chamber are designed identically to one another and/or wherein the at least one first reference measurement chamber and the second reference measurement chamber are designed identically to one another.

9. The spectroscopic analysis apparatus according to claim 3, wherein a first filter arrangement is provided and is configured to filter out wavelengths from the light generated by the illumination device so that the light that is radiated through the first measurement chamber and through the first reference measurement chamber only includes the first wavelength and/or wherein a second filter arrangement is provided and is configured to filter out wavelengths from the light generated by the illumination device so that the light that is radiated through the second measurement chamber and through the second reference measurement chamber only includes the second wavelength.

10. The spectroscopic analysis apparatus according to claim 9, wherein the illumination device is configured to generate a broadband light that at least includes light of the first and the second wavelengths.

11. The spectroscopic analysis apparatus according to claim 3, wherein the illumination device comprises at least a first light source and a second light source, wherein the first light source is configured to generate light with only the first wavelength, wherein the first light source is configured to couple the generated light into the first measurement chamber and into the first reference measurement chamber, and wherein the second light source is configured to generate light with only the second wavelength, wherein the second light source is configured to couple the generated light into the second measurement chamber and into the second reference measurement chamber.

12. The spectroscopic analysis apparatus according to claim 3, wherein the illumination device is configured to couple light with the first wavelength centrally into the first measurement chamber and into the first reference measurement chamber and to couple light with the second wavelength centrally into the second measurement chamber and into the second reference measurement chamber, wherein a first optical waveguide is arranged at a center of a first end face of the first measurement chamber or the first reference measurement chamber, and wherein a second optical waveguide is arranged at a center of a first end face of the second measurement chamber or the second reference measurement chamber.

13. The spectroscopic analysis apparatus according to claim 3, wherein the illumination device comprises at least a first light source that is configured to generate a first light with the first wavelength, and wherein the illumination device comprises at least a second light source that is configured to generate a second light with the second wavelength, wherein the first light source is arranged directly at the first measurement chamber and the first reference measurement chamber such that the generated first light radiates into both the first measurement chamber and the first reference measurement chamber or is arranged spaced apart from the first measurement chamber and the first reference measurement chamber so that the generated first light can be fed via a respective first optical waveguide to the first measurement chamber and the first reference measurement chamber, and wherein the second light source is arranged directly at the second measurement chamber and the second reference measurement chamber such that the generated second light radiates into both the second measurement chamber and the second reference measurement chamber or is arranged spaced apart from the second measurement chamber and the second reference measurement chamber so that the generated second light can be fed via a respective second optical waveguide to the second measurement chamber and the second reference measurement chamber.

14. The spectroscopic analysis apparatus according to claim 3, wherein the first measurement chamber and the first reference measurement chamber each comprise a photodiode, a pyroelectric detector, an image sensor or an optopneumatic detector, and/or wherein the second measurement chamber and the second reference measurement chamber each comprise a photodiode, a pyroelectric detector, an image sensor or an optopneumatic detector.

15. The spectroscopic analysis apparatus according to claim 1, wherein the spectroscopic analysis apparatus is configured to:

a) feed the same fluid or the same gas to the first measurement chamber and the second measurement chamber; or b) feed a different fluid or a different gas to the first measurement chamber and the second measurement chamber.

16. The spectroscopic analysis apparatus according to claim 1, wherein the spectroscopic analysis apparatus is free of a chopper wheel and/or a filter wheel.

17. A method for the spectroscopic analysis of fluid or gas using a multi-chamber cuvette, wherein the multi-chamber cuvette comprises at least two measurement chambers into which fluid or gas can be introduced for analysis, wherein the at least two measurement chambers comprise at least a first measurement chamber and a second measurement chamber, wherein the first measurement chamber and the second measurement chamber are separated from one another by a single common partition wall, wherein a first length of the first measurement chamber is equal to a second length of the second measurement chamber, wherein the multi-chamber cuvette is a single-piece extruded part, wherein the at least two measurement chambers are optically separated from one another, wherein an illumination device and a detection device are provided, and wherein the method comprises:

generating light by the illumination device and coupling the light into the first and second measurement chambers;

measuring an intensity of the light radiated by the fluid or the gas in the first measurement chamber for a first wavelength and generating a first measurement result by the detection device; and measuring an intensity of the light radiated by the fluid or the gas in the second measurement chamber for a second wavelength and generating a second measurement result by the detection device, wherein the first wavelength and the second wavelength are different.

18. The spectroscopic analysis apparatus according to claim 3, further comprising:

a common first image sensor configured to simultaneously receive the light radiated through the first measurement chamber and the light radiated through the first reference measurement chamber; and/or a common second image sensor configured to simultaneously receive the light radiated through the second measurement chamber and the light radiated through the second reference measurement chamber.

19. The spectroscopic analysis apparatus according to claim 3, further comprising a common image sensor configured to simultaneously receive the light radiated through the first and second measurement chambers and the light radiated through the first and second reference measurement chambers.

* * * * *